Patented Dec. 17, 1935

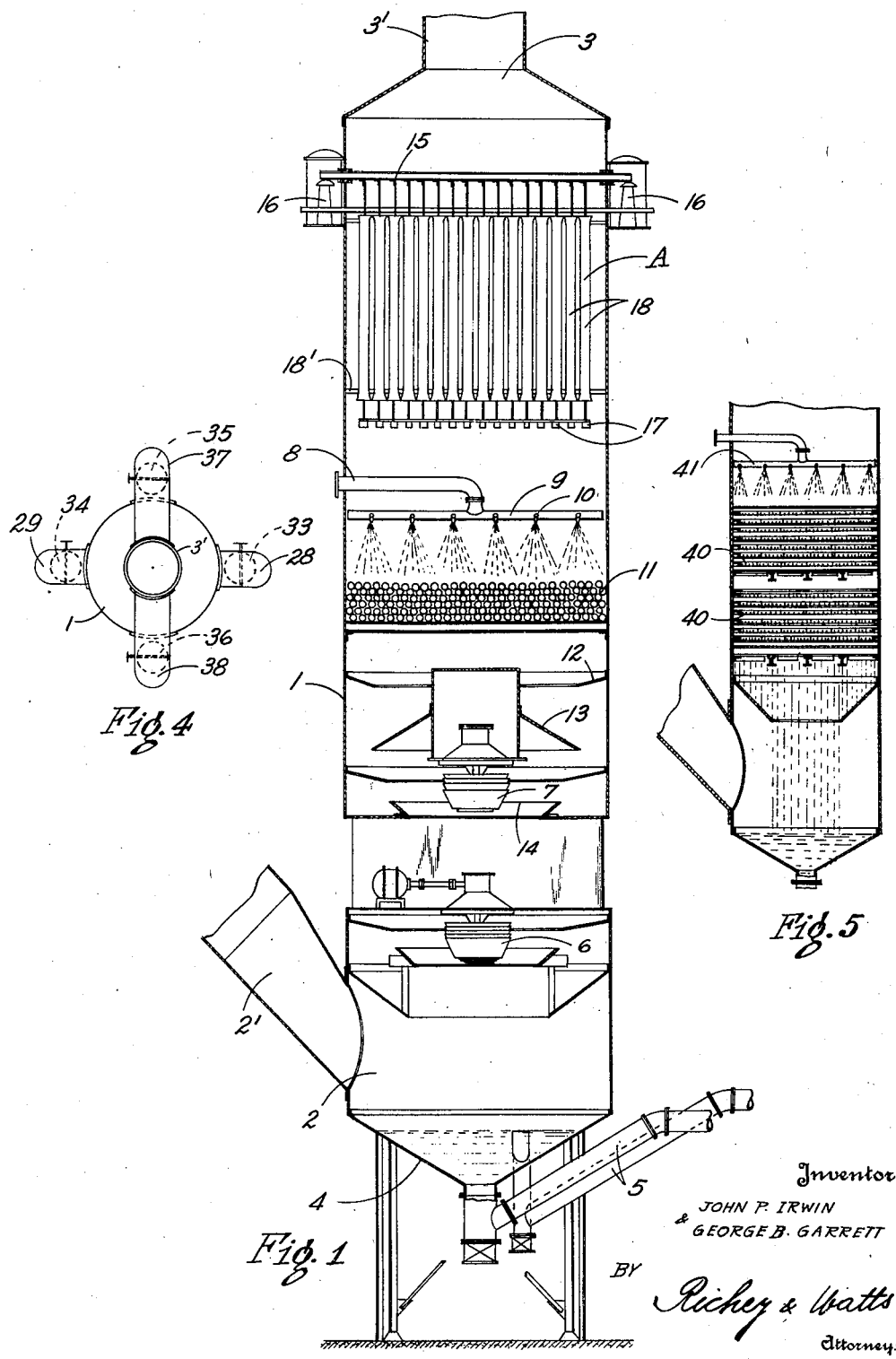

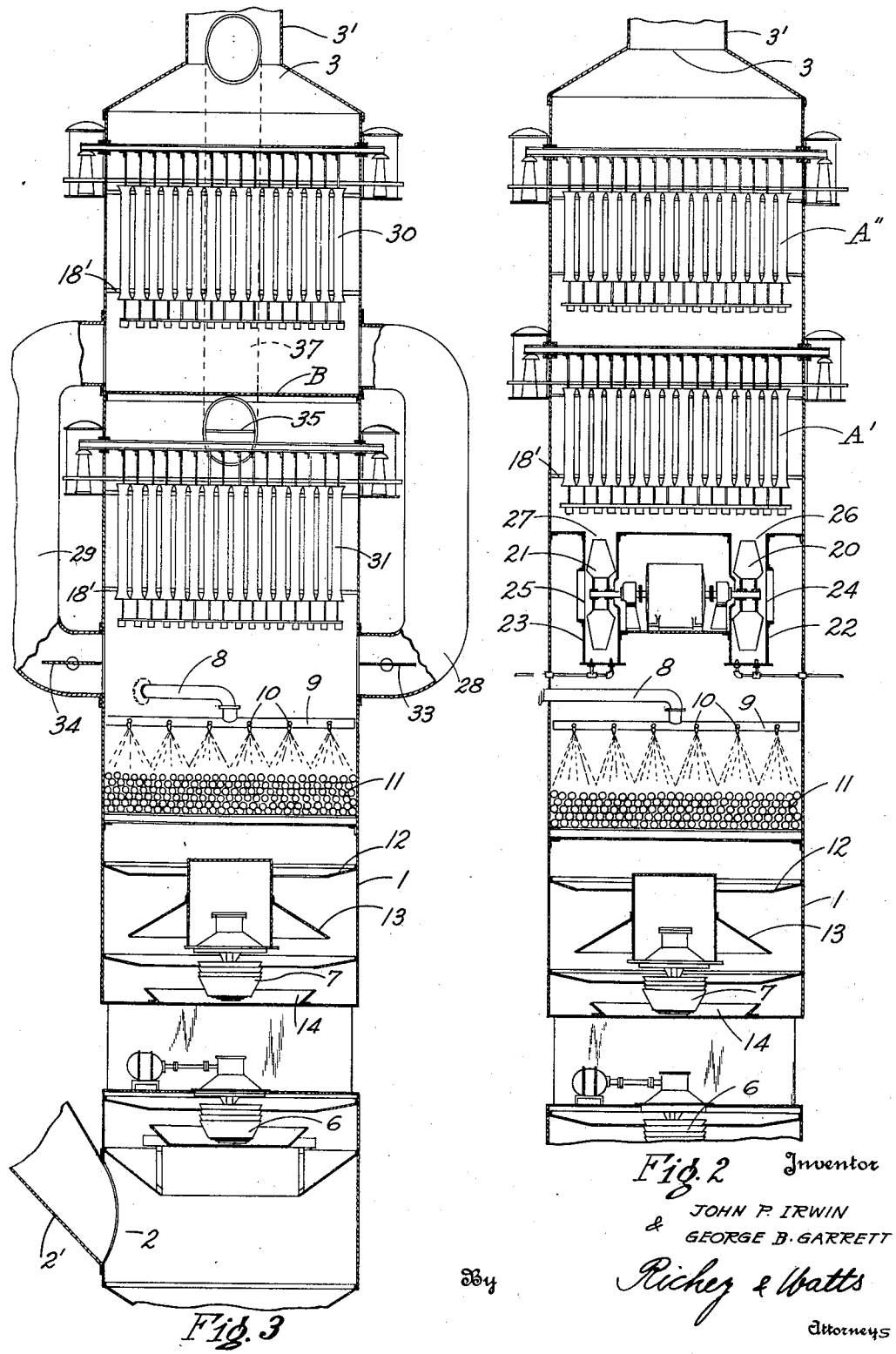

2,024,226

UNITED STATES PATENT OFFICE 2,024,226

APPARATUS FOR TREATING GAS

John P. Irwin, Rocky River, and George B. Garrett, Lakewood, Ohio

Application May 22, 1931, Serial No. 539,234

8 Claims. (Cl. 183—7)

This invention relates generally to gas treating, and more particularly to an improved apparatus for cleaning, cooling and drying blast furnace gases wherein the dust content of the gas may be economically reduced to a desired low value.

In the treatment of blast furnace gas for subsequent use in heating processes it has been found most expedient to wash it with sprays of water to remove as much as possible of the dirt contained therein. This washing is usually done in gas scrubbers of several well-known types. One form of such scrubber is illustrated and described in United States Patent No. 1,797,271, issued March 24, 1931 to Arthur G. McKee. Other forms of scrubbers employ combinations of baffles of various types, of wood or metal, vertically disposed or inclined, in combination with sprays, or in some instances a plurality of sprays alone have been used for this purpose. The washing done in these scrubbers is known as primary washing or cleaning and the usual result of passing blast furnace gas through such apparatus is to reduce the dust content of the gas to about .3 to .1 grain of dust per cubic foot of gas. This degree of cleanliness has, up to the present, been considered sufficient for use in the old type blast furnace stoves and for burning under boilers for the production of steam. However, in blast furnace stoves of the newer, relatively small checker type, it has been found desirable to have the glass cleaned to a considerably lower dust content than is possible to obtain with the primary washers alone.

Aside from the cleanliness of the gas there has always been difficulty in removing entrained moisture from the washed gas. It has, in the past, been customary to use various forms of moisture eliminators to remove this entrained moisture from the outgoing gas. These moisture eliminators have taken various forms such as large vertical towers filled with inclined baffles which cause the gas to follow a tortuous path on its passage through the tower and thus drop its entrained moisture, baskets filled with pipe nipples through which the gas must pass, channel screens built up of vertical steel channels uniformly spaced in rows with openings between and the alternate rows so staggered that the gas must follow a tortuous path in passing through, and centrifugal whorls.

Recent developments in the art have shown that blast furnace gas may be advantageously used as a fuel in metallurgical furnaces, such as open hearth furnaces, annealing furnaces, billet heating furnaces, etc., provided the dust content can be reduced to .04 or less grain of dust per cubic foot and the gas is delivered to the furnace substantially free from moisture. As a result of this development a number of secondary gas cleaning devices have come into use capable of reducing the dust content of the gas from the primary cleaners easily to .04 and, if desired, even to .005 grain of dust per cubic foot of gas. These secondary cleaners are of various kinds, among which may be noted disintegrators of the Theisen, Zschocke or Brassert types in which gas and water are intimately mixed and violently agitated by means of stationary and moving vanes or blades, operating in connection with moisture eliminators of the above described type, and electrical precipitators of the Cottrel type, in which the dust and moisture particles are charged with electricity and caused to collect upon one terminal of the electrical apparatus. Where electrical precipitators have been used they have been installed as separate units entirely independent of the primary washing apparatus. Due to the necessity of conducting the gas for considerable distances from the primary to the secondary cleaners of the old type installations, moisture eliminators have been used to prevent carrying over excessive quantities of moisture on account of its accumulation in the pipes.

This same moisture is beneficial to the operation of the electrical precipitators of our apparatus through its action in helping to flush down the positive electrodes, as it has been found advisable to continuously flush the positive electrodes thereof with water to prevent the accumulation of dust thereon. Our apparatus effects great savings over the above described old type installations having separated primary and secondary cleaning apparatus, as will more fully appear later.

In the above remarks with regard to the prior art we have used the terms primary and secondary cleaning apparatus and these terms will be used henceforth in the application in the above defined sense.

It has been customary to erect the primary gas cleaning apparatus at one part of the plant, close to the blast furnaces and stoves, and the secondary cleaning apparatus at a different point, further removed from the furnaces. The result of this construction is a very expensive system of gas mains, valves, structures and foundations which are both difficult to operate, costly to maintain and occupy a large ground area. Prior to our invention it has been impossible to clean gas to less than .1 grain of dust per cubic foot of gas in a single apparatus except by the use of excessive amounts of water and power. It is, therefore, among the objects of our invention to provide a single unitary apparatus of simple construction and relatively inexpensive first cost, which is adapted to clean, cool and dry the raw hot blast furnace gas direct from the furnace dust catchers.

Another object of our invention is to provide, in a single unit of small size and economical construction, a gas cleaner capable of handling raw gas direct from the dust catcher and delivering it at a cleanliness suitable for metallurgical processes, in other words, having a dust content of .04 grain of dust per cubic foot of gas or better, and substantially free from entrained moisture, fume and vapor.

Another object is to provide a unitary gas cleaning apparatus which occupies a relatively small ground area and whereby the necessity of expensive piping, valves, apparatus and buildings for housing same is eliminated.

Another object of our invention is the provision of a gas cleaning apparatus wherein certain steps in the cleaning processes previously employed are eliminated and wherein the cost of cleaning and the quantity of apparatus necessary to accomplish the cleaning are effectively reduced.

The above and other objects of our invention will appear from the following description of a preferred and several modified forms thereof, reference being had to the accompanying drawings, in which—

Fig. 1 is a vertical cross section taken through our improved gas cleaning apparatus.

Fig. 2 is a vertical cross section of a modified form of our gas cleaning apparatus in which are incorporated one or more booster fans for increasing the pressure of the gas delivered from the cleaner and two precipitators arranged in series.

Fig. 3 is a view similar to Figs. 1 and 2 but illustrating a modified form of cleaner in which two precipitators, arranged in parallel, are used.

Fig. 4 is a diagrammatic plan view of the cleaner shown in Fig 3.

Fig. 5 illustrates a primary gas washer of the baffle type which may, if desired, be utilized in our apparatus to effect the rough cleaning of the gas.

The gas cleaning apparatus illustrated in the drawings is particularly adapted to carry out our improved process and consists essentially of a vertically extending cylindrical shell 1 having a bottom inlet opening 2 and a top discharge outlet 3. The raw hot gas from the furnace dust catchers enters the shell 1 through the inlet pipe 2', passes upwardly through the shell and is discharged through the discharge pipe 3' which may conduct it to the blast furnace stoves, open hearth furnaces or other places where it is desired to use the gas.

The bottom 4 of the shell 1 is cone shaped and is provided with suitable discharge pipes 5 for the carrying away of the solid material removed from the gas and the water used in the cleaning process, thus forming a hopper in which solid and liquid material removed from the gas may be collected out of mixing contact with the dirty gas entering the shell through the inlet 2.

The primary cleaning apparatus is disposed in the lower part of the shell 1 and, as illustrated in Fig. 1, may consist of vertically spaced motor driven water spraying devices 6 and 7, preferably two or more in number, which are adapted to throw a fine spray of water across the path of the upwardly flowing gas. This apparatus may be of any suitable type, that illustrated being generally similar to the apparatus shown and described in the above noted patent to Arthur G. McKee. The supply of water for the sprayers 6 and 7 enters the shell 1 through the supply pipe 8 which is connected to a manifold pipe 9, which in turn is provided with a number of spray nozzles 10. These spray nozzles 10 are adapted to direct the water downwardly upon a plurality of baffles 11. These baffles 11 may be of any suitable form, those illustrated consisting of a plurality of pipes or tubes which extend across the shell 1. The surface of these tubes is maintained in a wet condition by the water from the nozzles 10. This provides a large wetted area over which the gas must pass and which assists in the removal of the dust therefrom. As the gas passes over the tubes 11 it is further cooled and water vapor will be condensed out in the form of small particles of moisture. This cooled wet gas is also caused to be evenly distributed by the bank of tubes 11, so that the velocity of all portions of the gas stream is kept uniform as it enters the precipitator where additional dirt and substantially all of the entrained moisture are removed.

After the water passes over the baffle tubes 11 it falls down upon the baffle plates 12 and 13 and thence to the sump 14 from which it is thrown out by the sprayer 7. After being sprayed by the sprayer 7 the water is again sprayed out by the sprayer 6 and finally collects in the conical bottom 4 of the cleaner. It will be understood that additional water may be supplied to the sprayers 6 and 7 if desired.

In Fig. 5 of the drawings we have illustrated a section of a cylindrical washer shell in which is installed a baffle type of washer. It will be understood that this washer may be substituted in the lower part of our apparatus either for the sprayers 6 and 7 alone or for both the sprayers 6 and 7 and the bank of tubes 11. This baffle washer is of well known type and consists of a plurality of layers of transversely extending slats 40. These slats are usually made of wood and are adapted to receive water sprayed from the manifold pipe 41, thus providing a large wetted surface over which the gas must pass during its upward flow through the shell. The water which leaves the lower layer of slats 40 falls in the form of rain through which the ascending gas passes and which assists in the intimate mixture of the gas with the water whereby the dust is removed from the gas. Other types of baffle washers may be employed in our apparatus but it is believed that that shown in Fig. 5 is sufficient to illustrate the fact that primary cleaners, other than the spray type, may be employed in our apparatus.

The above described apparatus effects the primary cleaning of the gas and reduces the temperature to approximately the desired point while increasing its moisture content due to the entraining of water from the sprayers. The secondary cleaning and drying apparatus is disposed within the shell 1 above the water inlet pipe 8 and preferably consists of the electrical precipitating unit generally indicated at A (Fig. 1).

This precipitating unit A may be of a known type which comprises bus bars 15 suitably supported on insulating supports 16. A plurality of wire negative electrodes 17 depend from the bus bar 16. Around the wire negative electrodes 17 are disposed the tubular positive electrode elements 18. The tubular electrodes 18 are mounted in a baffle plate 18' which causes all of the gas to pass through the precipitator tubes. In operation, these electrodes are connected to a source of high voltage electric current and as the gas rises through the spaces between the positive and negative electrodes the dust and moisture particles are charged with electricity and caused to precipitate or deposit upon the tubular positive electrodes 18. This precipitator is also effective in removing the alkali fume from blast furnace gas. Fume of this type is particularly undesirable when the gas is to be burned in the hot blast stoves because it attacks the checker work.

Where electrical precipitators are used as independent units it is necessary to provide considerable quantities of flushing water to wash the dust particles from the positive electrodes. In our improved gas cleaning apparatus the gas from the primary cleaning stage carries entrained moisture, which is electrically precipitated with the dust, and wets the surfaces of the electrodes of the precipitator. This materially assists in flushing down the dust which collects on the negative electrodes. The above described arrangement of primary scrubber and secondary electrical precipitator effectively cleans and thoroughly drys the gas, thus eliminating the necessity of providing a water separator or dryer for removing moisture from the gas before it is used.

In Fig. 2 of the drawings we have illustrated a modified form of our invention in which the booster fans 20 and 21 are interposed within the shell between the primary cleaning apparatus and the electrical precipitators. These fans may be sprayed with water and, when this is done, they will assist somewhat in the cleaning of the gas as well as increasing the pressure of the gas discharged through the outlet pipe 3'. The fans 20 and 21 are preferably mounted on horizontal axes and may be disposed within the housings 22 and 23 respectively. These fans are of the radial type and draw the gas into the housings 22 and 23 through the openings 24 and 25 and discharge it upwardly through the outlet openings 26 and 27.

In Fig. 2 two precipitator units A' and A" are arranged in superposed series relation and may have independent electrical connections so that they can be operated together or separately.

In Fig. 3 we have illustrated another modification of our invention in which two electrical precipitators, arranged in parallel, are employed. In this form of our invention the gas which passes through the primary washer zone is divided, a certain proportion being by-passed through the pipes 28 and 29 to the upper precipitator unit 30, while the remainder of the gas passes directly through the lower precipitator unit 31 and is carried to the discharge pipe 3' through pipes 37 and 38. The clean dry gas from both the precipitators 30 and 31 is carried away by the discharge pipe 3'. Valves 33, 34, 35 and 36 may be provided in the by-pass pipes 28 and 29 and the outlet pipes 37 and 38 of the lower precipitator 31. It will be seen that, by closing the valves 33 and 34, the upper precipitator will be rendered inoperative and, in like manner, by closing the valves 35 and 36 the gas will be prevented from flowing through the lower precipitator unit.

The wall B which extends across the shell 1 prevents the passage of gas from the precipitator 31 to precipitator 30. The total cross sectional area of the by-pass pipes 28 and 29 is preferably equal to approximately one-half the effective cross sectional area of the shell so that the flow of gas will not be restricted. For the same reason the area of discharge pipes 37 and 38 may equal approximately one-half of the effective cross sectional area of the shell. It will be understood that, if necessary, a greater number of these by-pass pipes and discharge pipes than that illustrated in the drawings may be employed without departing from the spirit of our invention. The proportion of gas which passes through each of the precipitators 30 and 31 may be controlled by the valves 33, 34, 35 and 36. For example, if the valves 33 and 34 are partially closed and valves 35 and 36 opened wide, the greater part of the gas which enters the shell will pass through the lower precipitator unit 31. This construction is of value in that it permits the shut down of one of the precipitators in case of failure without the complete shut down of the cleaner.

It will be seen by those skilled in the art that, as the gas flows through our cleaner and dryer in a relatively unimpeded vertical path, the back pressure will be relatively small and the power necessary to force the gas through the cleaning apparatus will be reduced to a minimum. Moreover, the gas will be discharged through the outlet 3 in suitable condition for use in metallurgical furnaces, internal combustion engines, and other places where the provision of a dry gas of extremely low dust content is required. Where it is desirable to deliver gas at a higher pressure than when received, booster fans as shown in Fig. 2 can be employed, which not only boost the pressure but increase the cleanliness as well. Similarly, these fans will permit the passage of a greater volume of gas through a given unit without loss of cleanliness.

Although we have illustrated and described in some detail several forms of apparatus suitable for carrying out our improved method, it will be seen by those skilled in the art that modifications and variations thereof may be made without departing from the spirit of our invention. For example, any number of precipitating units, arranged either in series or in parallel, may be employed. We do not, therefore, wish to be limited to the specific form herein shown and described, but claim as our invention all embodiments thereof coming within the scope of the appended claims.

We claim: —

1. Gas cleaning apparatus comprising a shell having a gas inlet and a gas outlet, primary cleaning means in said shell adjacent said inlet for reducing the dust content of and adding moisture to the stream of gas passing through said shell, an electrical precipitator in said shell having a plurality of tubular electrodes and means, in said shell between said primary cleaning means and said electrical precipitator, for directing the gas into said tubular electrodes in a stream of substantially uniform velocity at all points of its cross sectional area.

2. Gas treating apparatus comprising a shell, a primary stage of gas cleaning apparatus in the lower part of said shell, a plurality of electrical precipitator gas cleaning and drying units arranged in superimposed relation within said shell above said primary gas cleaning apparatus and means, including a baffle wall and a by-pass pipe, for connecting said electrical precipitator units in parallel relation whereby part of the gas from the primary cleaning stage passes through one of said precipitator units and the remainder of the gas through another of the precipitator units.

3. Gas treating apparatus comprising a shell and primary stage of gas cleaning apparatus in the lower part of said shell, a plurality of electrical precipitator gas cleaning and drying units arranged in superimposed relation within said shell above said primary gas cleaning apparatus, means, including a baffle wall and a by-pass pipe, for connecting said electrical precipitator units in parallel relation whereby part of the gas from the primary cleaning stage passes through one of said precipitator units, and the remainder of the gas through another of the precipitator units, and valve means for controlling the proportion of the gas which flows through each of said precipitator units.

4. Gas cleaning apparatus including in combination a vertically extending tubular shell having a gas inlet in its bottom portion and a gas outlet in its upper portion, a plurality of liquid sprayers arranged in superimposed relation in the lower part of said shell, means for supplying liquid to said sprayers, and an electrical precipitator disposed in the upper part of said shell above said liquid sprayers and below said gas outlet, said precipitator including vertical tubular electrode members open at their ends and so disposed within the shell that liquid precipitated out of the gas will pass down through the shell and be sprayed by said liquid sprayers.

5. Gas cleaning apparatus including in combination a vertically extending tubular shell having a gas inlet in its bottom portion and a gas outlet in its upper portion, a liquid sprayer disposed in the lower part of said shell, means for supplying liquid to said sprayer and an electrical precipitator disposed in the upper part of said shell above said liquid sprayer, said precipitator being so disposed within the shell that liquid precipitated out of the gas thereby will pass down through the shell and be sprayed by said liquid sprayer.

6. Gas cleaning apparatus comprising a shell having an inlet for gas having solid material entrained therein and a clean gas outlet, primary cleaning means in said shell adjacent said inlet for reducing the solids content of and adding moisture to the stream of gas passing through said shell, an electrical precipitator in said shell, means in said shell between said primary cleaning means and said electrical precipitator for directing gas into said precipitator in a stream of substantially uniform velocity throughout its cross sectional area and hopper means in said shell below said dirty gas inlet.

7. Gas cleaning apparatus including in combination a vertically extending tubular shell having a gas inlet in its bottom portion and a gas outlet in its upper portion, a liquid sprayer in the lower part of said shell, means for supplying liquid to said sprayer, an electrical precipitator disposed in the upper part of said shell above said liquid sprayer, said precipitator including vertical tubular electrode members so disposed within the shell that liquid precipitated out of the gas will pass down through the shell and be sprayed by said liquid sprayer.

8. Gas cleaning apparatus comprising a shell having a gas inlet and a gas outlet, primary cleaning means in said shell adjacent said inlet for reducing the dust content of and adding moisture to the stream of gas passing through said shell, an electrical precipitator in said shell and means in said shell, between said primary cleaning means and said electrical precipitator, for directing the gas into said electrical precipitator in a stream of substantially uniform velocity at all points of its cross sectional area.

JOHN P. IRWIN.
GEORGE B. GARRETT.